May 19, 1936.  O. FÖPPL  2,041,123

KEY AND KEY JOINT

Filed Aug. 3, 1934

Otto Föppl

Patented May 19, 1936

2,041,123

UNITED STATES PATENT OFFICE 2,041,123

KEY AND KEY-JOINT

Otto Föppl, Brunswick, Germany

Application August 3, 1934, Serial No. 738,369
In Germany October 23, 1933

5 Claims. (Cl. 287—52.05)

My invention relates to improvements in splines or keys and key-joints.

The object of the key-joint, for mounting for example a fly wheel, a pulley or another element on a shaft, is to connect the said parts as rigidly as possible. Now the shaft is subject to elastic deformation by the forces acting thereon, and at the part where the shaft is rigidly connected with the hub of the fly wheel or another element the shaft is not deformed, the reason being that the moment of inertia of the cross-section of the combined hub and fly wheel is a great multiple of that of the cross-section of the shaft, and therefore the deformation of the hub is almost zero as compared to the deformation of the free part of the shaft.

In key-joints such as are now in use the large deformations of the shaft and the small deformations of the portions of the shaft carrying the said element suddenly merge into each other at the part where the key begins to be effective, that is in the plane of the end face or end faces of the hub, or in the plane where the straight side faces of the key merge into the rounded end portions, and therefore at this part or parts suddenly high power is transmitted by the key to the shaft, the result being that in case of high forces the shaft or key-joint is subject to gradual destruction.

The object of the improvements is to provide a key-joint in which this danger is obviated, and with this object in view my invention consists in constructing the key-joint so that the power is not suddenly transmitted by the key but gradually and over a part of the length of the key. In carrying out the invention the end or ends of the key located at the side of the element to which the power is transmitted are constructed so as to be yieldable, and for this purpose the end or ends of the key are not made solid, but they are formed with suitable cut-out portions or recesses providing tapering end portions at both sides of the key.

For the purpose of explaining the invention two examples embodying the same have been shown in the accompanying drawing, in which the same letters of reference have been used in all the views to indicate corresponding parts.

In said drawing.

Figure 1:
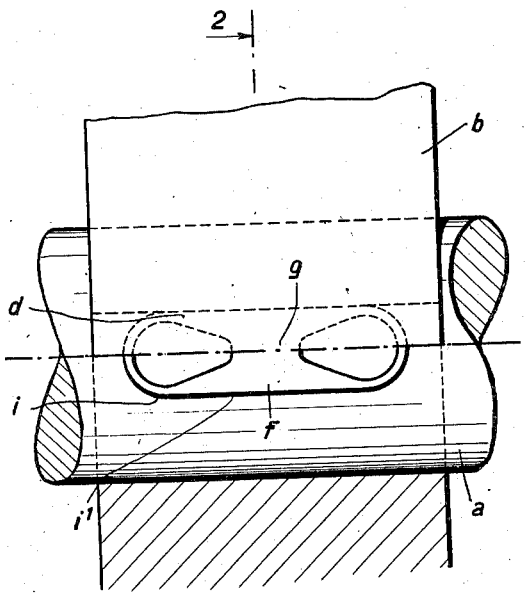
Fig. 1 is a fragmentary elevation partly in section showing a key-joint.
Figure 2:
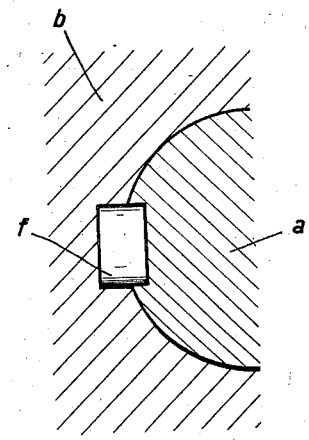
Fig. 2 is a fragmentary sectional elevation taken on the line 2—2 of Fig. 1.
Figure 3:
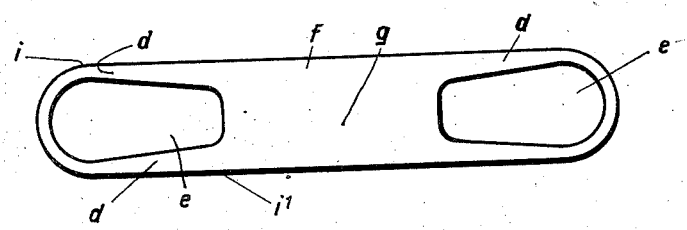
Fig. 3 is a plan view on an enlarged scale showing the key.

In the construction shown in Figs. 1 to 3 the key $f$ is formed at both ends with holes $e$ which are reduced in cross-section from their outer to their inner parts thus providing outwardly tapering flanges $d$ at the ends of the key. The median portion $g$ of the key is solid and therefore it provides a rigid connection between the shaft $a$ and the median part of the hub or other element $b$, and there is no possibility of the shaft and hub being displaced relatively to each other. The end portions $d$ of the key are adapted slightly to yield to the forces transmitted thereto by the shaft $a$ and the hub $b$, the elasticity of the flanges being so much the larger the thinner the flanges are.

Figure 4:
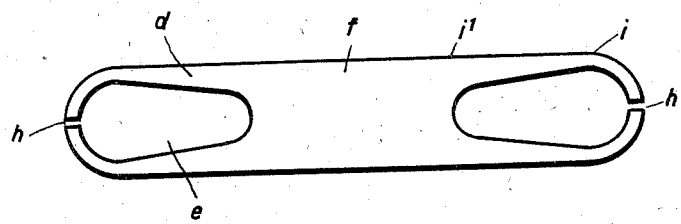
Fig. 4 is a similar plan view showing a modification of the key.

The modification shown in Fig. 4 is similar to the construction shown in Fig. 3, and the same letters of reference have been used to indicate corresponding parts. But the key is slotted at both ends at $h$. Thereby the elasticity of the flanges $d$ is further increased.

The thickness of the flanges $d$ must be such that the danger of rupture is the same at the part $i$ where the plane side faces of the key merge into the rounded end portions thereof, as at the part $i'$ where the key is solid. If the thickness of flanges $d$ is large the result attained thereby is comparatively small, and therefore the shaft will break at the part $i$, and if the flanges are too thin the rupture will begin at the part $i'$, because the transmission of power begins at this part. The expedient is most effective if the thickness of flanges is exactly such that the danger of rupture is the same at $i$ and $i'$.

I claim:

1. In combination, a shaft, a member mounted on said shaft, said shaft and said member having registering longitudinal keyways, a key in said keyways having a solid central portion and having yieldable end portions, both said solid portion and said end portions closely fitting the keyways laterally thereof, whereby the central portion forms a positive, non-resilient driving means while the end portions allow for twisting of the shaft due to torsional stress.

2. A device as in claim 1, the material of the key being removed adjacent the ends thereof to provide holes through the key while leaving its side edges intact.

3. A device as in claim 1, the key having holes adjacent its ends tapering laterally outward but leaving its side edges intact and having slots extending outward from said holes to the outer ends of the key.

4. In combination, a shaft, a member mounted on said shaft, said shaft and said member having registering longitudinal keyways, a key in said keyways said key having a solid portion closely fitting said keyways laterally thereof, and a resilient extension also closely fitting said keyways whereby the solid portion forms a positive non-resilient driving means and the resilient portion permits twisting of the shaft under torsional stress.

5. A key having a flat body which is solid for a substantial portion of its length, said key having holes therethrough at its ends, the holes approaching nearly to the ends of the key and increasing in width progressively toward the ends of the key and being of arcuate form at their outer ends and the outer ends of the key being approximately concentric with the outer ends of the holes.

OTTO FÖPPL.